United States Patent [19]
Ware

[11] 3,980,197
[45] Sept. 14, 1976

[54] ELECTRICAL OUTLET BOX

[75] Inventor: Gordon K. Ware, St. Charles, Ill.

[73] Assignee: Ware Fuse Corporation, Chicago, Ill.

[22] Filed: Mar. 17, 1975

[21] Appl. No.: 559,355

Related U.S. Application Data

[63] Continuation of Ser. No. 137,146, April 25, 1971, abandoned.

[52] U.S. Cl. .................................. 220/3.6; 174/58; 220/3.8
[51] Int. Cl.² .......................................... H02G 3/08
[58] Field of Search ........................... 220/3.2–3.94, 220/18; 174/53–58

[56]  References Cited
UNITED STATES PATENTS

| | | | |
|---|---|---|---|
| 1,869,646 | 8/1932 | Anderson | 220/3.8 |
| 1,943,001 | 1/1934 | Clayton | 174/58 |
| 2,211,102 | 8/1940 | Davis | 46/193 |
| 2,211,929 | 8/1940 | Hallberg | 220/3.2 |
| 2,590,391 | 3/1952 | Elmore | 220/3.6 |
| 2,605,012 | 7/1952 | Duncan | 220/3.6 |
| 2,843,652 | 7/1958 | Manzella | 220/3.5 |
| 2,870,931 | 1/1959 | Buckels | 220/3.6 |
| 2,917,199 | 12/1959 | Appleton | 220/3.92 |
| 2,954,419 | 9/1960 | Bolef et al. | 220/3.8 |
| 3,701,451 | 10/1972 | Schindler et al. | 220/3.9 |
| 3,927,785 | 12/1975 | Kinney et al. | 220/3.8 |

Primary Examiner—William Price
Assistant Examiner—Stephen Marcus
Attorney, Agent, or Firm—Olson, Trexler, Wolters, Bushnell & Fosse, Ltd.

[57] ABSTRACT

A box for receiving electrical outlets, switches, cover plates and the like of standard size and including a portion insertable through an opening in a wall and projecting laterally of the opening when fully assembled for increasing the interior volume of the box.

4 Claims, 7 Drawing Figures

U.S. Patent    Sept. 14, 1976    3,980,197
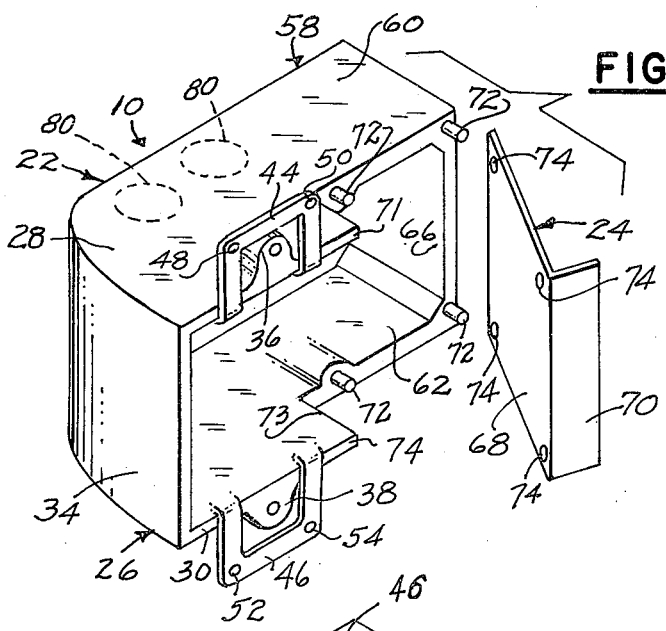
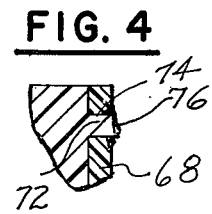
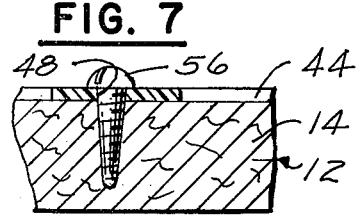
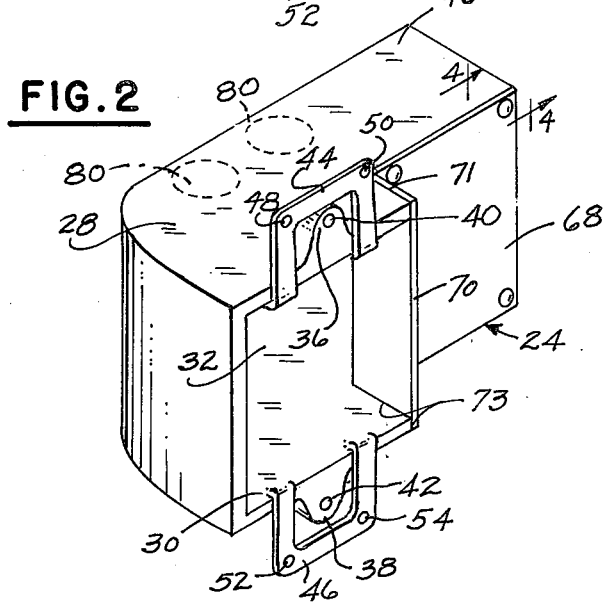
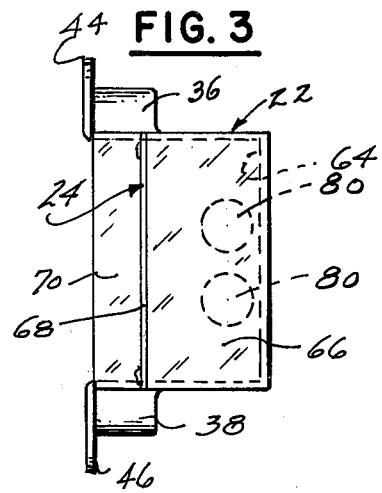
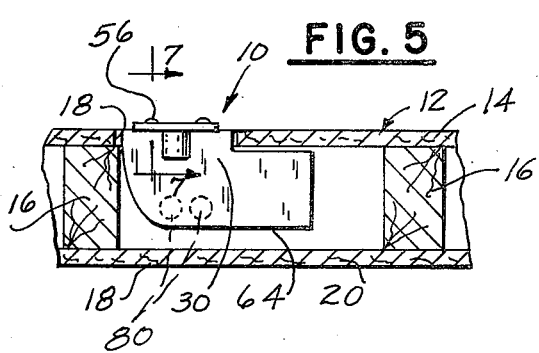
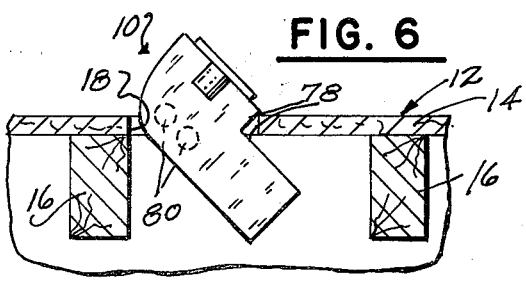
Inventor
GORDON K. WARE
By Olson, Trexler, Walters & Bushnell
Attorneys

ELECTRICAL OUTLET BOX

This is a continuation of application Ser. No. 137,146 filed Apr. 25, 1971 now abandoned.

The present invention relates to a novel box or receptacle for receiving electrical components such as outlets, switches and the like and more specifically to a novel receptacle or box especially suitable for use in wiring systems in buildings, mobile homes and the like.

In the construction industry, components for electrical wiring have been standardized as to certain dimensions and sizes. This permits components of various manufacturers to be interchanged with each other. Boxes or receptacles adapted to mount electrical outlets, switches and the like generally have standardized dimensions so that they may receive electrical components of standard size as well as cover plates of standard size.

The receptacles or boxes as well as other components usually must meet the specifications of various electrical codes or standards established by Underwriters. One specification for receptacles or outlet boxes relates to the volume within the box. In many instances prior receptacles or boxes do not have sufficient internal volume to meet code requirements and this is especially true in receptacles or boxes which are to be used in mobile home construction which usually has a thinner wall than a conventional building.

In my co-pending application Ser. No. 888,258 filed Dec. 29, 1969, the disclosure of which is incorporated herein by reference, there is disclosed a box construction incorporating two or more box members adapted to be telescopically associated with and/or assembled from behind a wall to obtain significantly increased volumetric capacity. While such heretofore proposed structures are satisfactory in many instances, the present invention contemplates a novel receptacle or box structure which is of simplified and more economical construction and which may be readily assembled through a wall opening of standard size from the outside thereof while still providing significantly increased internal volumetric capacity.

More specifically, it is an important object of the present invention to provide a novel receptacle or box structure having a first portion adapted to receive electrical outlets, switches, cover plates and the like of standard dimensions and a second laterally extending portion for increasing the internal volume of the structure, which receptacle is constructed so that it may be readily assembled through an opening in a wall panel or surface of standard size and then manipulated so as to position said second portion behind the wall panel and the first receptacle portion in alignment with the opening.

Still another object of the present invention is to provide a novel receptacle or box structure of the above described type which may be easily and economically molded from plastic or other suitable materials.

Still another object of the present invention is to provide a novel receptacle or box structure of the above described type having mounting portions which may be readily manipulated for accommodating minor dimensional variations in a wall opening in which the device is to be mounted for minimizing the necessity of holding close manufacturing tolerances.

A still further object of the present invention is to provide a novel receptacle or box structure of the above described type having mounting portions cooperable with fasteners such as screws for minimizing any possibility of inadvertent loosening of the fasteners.

Other objects and advantages of the present invention will become apparent from the following description and the accompanying drawings wherein:

FIG. 1 is an exploded perspective view showing a receptacle or a box structure incorporating features of the present invention;

FIG. 2 is a perspective view showing the box structure in an assembled condition;

FIG. 3 is a right hand end view of the box structure shown in FIG. 2;

FIG. 4 is an enlarged fragmentary sectional view taken along line 4—4 of FIG. 2;

FIG. 5 is a partial sectional view showing a box structure incorporating features of the present invention assembled in a wall;

FIG. 6 is a view similar to FIG. 5, but showing the box or receptacle in an intermediate stage of assembly with the wall; and FIG. 7 is an enlarged fragmentary sectional view taken along line 7—7 of FIG. 5.

Referring now more specifically to the drawings wherein like parts are designated by the same numerals throughout the various figures, a receptacle or box structure 10 is shown which incorporates features of the present invention. The box structure is adapted to be mounted in wall 12 as shown in FIGS. 5 and 6. While the box structure of the present invention may be used in various wall constructions, it is especially suitable for use in walls of mobile homes which are relatively thin as compared with walls in conventional buildings.

For purposes of illustrating one application of the present invention, the wall 12 comprises a front panel 14 secured to a plurality of studs 16. An opening 18 of conventional dimensions for receiving an outlet box or receptacle is formed in the panel 14. The wall is completed by a back panel 20 is secured to the studs oppositely from the front panel 14 as shown in FIG. 5. As indicated in FIG. 6, the receptacle or box 10 may be assembled with the wall structure prior to the time when the back panel 20 is secured to the studs as will be described more in detail below.

In accordance with features of the present invention, the box structure 10 includes a main body member 22 and a cover member 24. The body member 22 is preferably molded in one piece from a tough resilient fire-resistant plastic material. The cover member 24 is also preferably molded from such a plastic material and the two parts are secured together as will be described below.

The main box or body member 22 is formed with a first box portion 26 having opposite side walls 28 and 30 joined by a bottom wall 32 and an end wall 34. The side and end walls 28, 30, 34 have a height which is preferably similar to the thickness of the wall structure 12 and have outer edges or margins terminating in a substantially common plane for projecting through the opening 18 in the wall panel 14 when the box is assembled with the wall as shown in FIG. 5.

Bosses 36 and 38 are integrally formed with the side walls 28 and 30. These bosses respectively have screw or fastener accommodating apertures 40 and 42 formed therein and spaced from each other a distance established by predetermined standards so that the box portion 22 is adapted to receive and mount any standard electrical component such as a switch, electrical outlet or the like.

Mounting ears 44 and 46 are also integrally formed with the opposite side walls 28 and 30 of the box member and project laterally outwardly from upper margins thereof. The mounting ears are preferably in the form of generally U-shaped elements having leg portions integrally joined to the sides of the box and connecting the bight portions. Apertures 48 and 50 are formed in the leg portions of the U-shaped mounting element 44 and similar apertures 52 and 54 are formed in the leg portions of the U-shaped mounting element or ear 46 for accommodating fasteners such as screws and the like.

The plastic material from which the box member is formed is sufficiently tough and rigid to provide the box structure with the desired strength. At the same time, the plastic material is sufficiently resiliently yieldable so that the relatively thin U-shaped mounting elements or ears 44 and 46 may be manually manipulated and stretched or bent to align the fastener receiving apertures therein with complementary apertures or portions of the wall structure into which the fasteners are to be driven.

In the embodiment shown in FIGS. 5 and 7, screws 56 are used as the fasteners for securing the box with respect to the wall structure 12. As shown particularly in FIG. 7, the diameter of the apertures 48, 50, 52 and 54 is initially less than the diameter of the screw shank so that the resilient plastic material of the mounting ears serves tightly to grip the fastening screws in a manner which resists retrograde rotation of the screws and effectively locks the screws against accidental loosening.

In addition to the first portion 26, the main box member 22 includes a second portion 58. The second box portion projects laterally from the first portion and comprises opposite side walls 60 and 62 and a bottom wall 64 which are respectively continuations of the sidewalls 28 and 30 and the bottom wall 32. The box portion 58 also has an end wall 66 oppositely disposed from the end wall 34. Box portions 22 and 58 are in open communication with each other so that the combined interior volumes thereof make up the total capacity of the box structure.

In order to provide clearance for the wall panel when the box structure is assembled in the wall, upper margins of the walls 60, 62 and 66 are disposed in a plane offset from the plane of the upper margins of the walls 28, 30 and 34 a distance similar to but greater than the thickness of the wall panel 14. The cover or top member 24 is preferably molded in one piece and includes a cover panel 68 having a size and shape corresponding to the size and shape of the box portion 58 for completely overlying the upper margins of the wall sections 60, 62 and 66. In addition the cover member has an upstanding wall or flange portion 70 adapted to abut free upstanding edge portions 71 and 73 of the first box portion walls 28 and 30. The wall section or flange 70 extends so that its outer or upper free marginal edge is disposed in the same plane as the upper edges of the wall sections 28, 30 and 34. Thus, the flange 70 serves to complete the side enclosure of the box portion 26 when the parts are fully assembled with each other as shown best in FIGS. 2 and 3.

The cover member 24 is permanently secured to the main box member 22. More specifically, the main box member is provided with a plurality of integral studs 72 projecting upwardly from the wall sections 60 and 62 and arranged for entering complementary apertures 74 located adjacent the four corners of the cover panel 68. While as indicated above, the plastic material from which the box structure is formed is preferably fire resistant, it is also preferably thermoplastic. Thus, the cover member may be easily secured to the main box member by melting end portions of the studs 70 and immediately adjacent areas of the cover panel for providing a welded connection, as indicated best at 76 in FIG. 4.

As shown in FIGS. 5 and 6, the opening 18 of the wall panel 14 with which the box structure is to be assembled is preferably formed so that it has a width similar to but slightly greater than the width of the box portion 26. Preferably the dimensions of the box portion 26 are essentially the same as corresponding dimensions of standard wall outlets or switch boxes and similarly the dimensions of the opening 18 are in accordance with usual standards so that the box and the opening may be covered with a standard switch or cover plate, not shown. The overall height or thickness of the box structure and particularly the box portion 58 is less than the width of the opening 18 in the direction viewed in FIG. 5 so as to permit assembly of the box structure with the wall.

As previously indicated, the box structure 10 is adapted to be assembled with the wall structure 12 from the front or outer side of the panel 14. In assembling the box structure with the wall, the box portion 58 is first inserted through the opening 18 as shown in FIG. 6. It is to be noted that the end wall 34 of the box has an arcuate configuration so as to avoid interference with the edge of the opening 18 during assembly of the box with the wall 12. More specifically, the end wall 34 preferably has a substantially straight or flat section extending inwardly from its upper or outer edge a distance at least substantially as great as the thickness of the wall panel 14, which straight or flat section merges with an arcuate section having a curvature or radius such that the distance between the outer surface of the wall 34 at all locations and points 78 indicated in FIG. 6 generally at the opposite side of the box portion 26 and engageable with the wall panel 14 during assembly of the box with the wall 12, is not greater than the width of the opening 18. Thus, during assembly of the box with the wall structure 12, the box may be initially inserted through the opening 18 as shown in FIG. 6 and then pivoted generally around the points 78 to the position shown in FIG. 5, at which position the mounting elements or ears 44 and 46 will be flush against the outer surface of the wall panel 14. Final securing of the box in the mounted position is accomplished by applying fasteners 56 in the manner described above.

After the box is assembled with the wall, an electrical outlet, switch or the like may be mounted in the box in the usual fashion. Knock out elements 80 are provided at any desired location in the various walls of the box structure. These knock out elements are connected with the wall by relatively thin easily rupturable joints so that one or more of the knock out elements can be removed for permitting the connection of electrical wires or conduits with the box in a known manner.

As shown in the drawings, a pair of the knock out elements 80 is preferably provided in each of the side walls 28 and 30 of the box portion 26. It is to be noted that these knock out portions are not centered with respect to the electrical switch or outlet mounting bosses, but to the contrary, are offset in a direction toward the laterally extending box portion 58. This arrangement provides clearance for the arcuate or curved portion of the end wall 34 and also enables wires to be brought into the box at locations selectively offset or in general alignment with the terminals with which they are to be connected so that an electrician may select an arrangement which facilitates the final electrical connection of the wires. In addition to the knock out elements in the opposite sides of the box, similar knock out elements are preferably provided in the end wall 66.

While a preferred embodiment of the present invention has been shown and described herein, it is obvious that many structural details may be changed without departing from the spirit and scope of the appended claims.

This invention is claimed as follows:

1. An electrical outlet box structure of the type described adapted to be assembled through an opening of predetermined width in a wall panel or the like, comprising tough resiliently yieldable plastic means forming a one-piece main box member providing sidewalls, a first end wall and a bottom wall of a first box portion, and also providing a second box portion with said side walls, a bottom wall and an end wall opposite said first end wall of said first box portion, said side and end walls having upper margins defining an opening opposite from said bottom wall; and a cover member joined to said main box member, said cover member providing a second end wall for said first box portion and a top wall for said second box portion, said second box portion being in open communication with said first box portion and including a top wall formed by said cover member offset inwardly from said upper margin, and tough resiliently yieldable plastic mounting elements integral with and projecting laterally from opposite sides of said first box portion and being yieldable for permitting manipulation by stretching and bending for accomplishing alignment with a desired cooperable portion of the wall panel or the like with which the box structure is being mounted.

2. An electrical outlet box structure, as defined in claim 1 wherein said main box member is molded in one piece from tough, thermal plastic material, said main box member including integral stud elements projecting from the walls of said second box portion, said cover including apertures receiving said stud elements, and said stud elements being thermally welded to said cover.

3. An electric outlet box structure, as defined in claim 1 wherein said mounting elements have apertures therein defined by annular margins for receiving fasteners with shanks, said margins having pre-sized diameter less than corresponding diameters of said shanks for resiliently engaging and contactively gripping the shanks and restraining the fasteners against retrograde movement.

4. An electrical outlet box structure as claimed in claim 1, wherein each of the mounting elements is of U-shape with the legs having integral connections with the material of corresponding opposite side walls of said first box portion and projecting laterally with the bight portions of each mounting element spaced from a said corresponding side wall and being yieldable for permitting manipulation by stretching and bending of the U-shaped elements for accomplishing alignment with a desired cooperable portion of the wall panel or the like with which the box structure is being mounted.

* * * * *